(12) United States Patent  (10) Patent No.: US 9,098,916 B2
Llach et al.  (45) Date of Patent: *Aug. 4, 2015

(54) BIT-ACCURATE FILM GRAIN SIMULATION METHOD BASED ON PRE-COMPUTED TRANSFORMED COEFFICIENTS

(75) Inventors: Joan Llach, Princeton, NJ (US);
Cristina Gomila, Princeton, NJ (US);
Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1900 days.

This patent is subject to a terminal disclaimer.

(21) Appl. No.: 11/667,629

(22) PCT Filed: Oct. 26, 2005

(86) PCT No.: PCT/US2005/038802
§ 371 (c)(1),
(2), (4) Date: May 11, 2007

(87) PCT Pub. No.: WO2006/055208
PCT Pub. Date: May 26, 2006

(65) Prior Publication Data
US 2007/0269125 A1  Nov. 22, 2007

Related U.S. Application Data

(60) Provisional application No. 60/628,837, filed on Nov. 17, 2004.

(51) Int. Cl.
*G06K 9/36* (2006.01)
*G06K 9/40* (2006.01)
(Continued)

(52) U.S. Cl.
CPC . *G06T 5/10* (2013.01); *G06T 5/002* (2013.01);
*H04N 19/117* (2014.11); *H04N 19/136* (2014.11); *H04N 19/176* (2014.11); *H04N 19/46* (2014.11); *H04N 19/80* (2014.11);
(Continued)

(58) Field of Classification Search
None
See application file for complete search history.

(56) References Cited

U.S. PATENT DOCUMENTS 4,897,775 A  1/1990  Kaassens
4,935,816 A  6/1990  Faber
(Continued)

FOREIGN PATENT DOCUMENTS

CN  1530252  9/2004
EP  0364285  4/1990
(Continued)

OTHER PUBLICATIONS

Oktem et al., "Transform Domain Algorithm for Reducing Effect of Film-Grain Noise in Image Compression" Electrnonic Letters, Oct. 14, 1999, vol. 35, No. 21.*

(Continued)

*Primary Examiner* — Randolph I Chu
(74) *Attorney, Agent, or Firm* — Robert D. Shedd; Robert B. Levy (57) ABSTRACT

Creation of a Bit-accurate film grain pattern for blending in an image block occurs by first establishing a set of bit-accurate transformed coefficients. The set of bit-accurate transformed coefficients undergo frequency filtering and a subsequent bit-accurate inverse transformation to yield the film grain pattern. The film grain pattern can then undergo blending with an image block to restore the look of film to the image.

12 Claims, 6 Drawing Sheets

(51) Int. Cl.

| | |
|---|---|
| G06T 5/10 | (2006.01) |
| G06T 5/00 | (2006.01) |
| H04N 19/176 | (2014.01) |
| H04N 19/46 | (2014.01) |
| H04N 19/117 | (2014.01) |
| H04N 19/136 | (2014.01) |
| H04N 19/80 | (2014.01) |
| H04N 19/85 | (2014.01) |

(52) U.S. Cl.
CPC ..... *H04N 19/85* (2014.11); *G06T 2207/10016* (2013.01); *G06T 2207/20052* (2013.01); *G06T 2207/20204* (2013.01)

(56) References Cited

U.S. PATENT DOCUMENTS

| | | | |
|---|---|---|---|
| 4,998,167 | A | 3/1991 | Jaqua |
| 5,028,280 | A | 7/1991 | Ihara et al. |
| 5,140,414 | A | 8/1992 | Mowry |
| 5,216,556 | A | 6/1993 | Steinberg et al. |
| 5,262,248 | A | 11/1993 | Ihara et al. |
| 5,285,402 | A | 2/1994 | Keith |
| 5,285,482 | A | 2/1994 | Sehier et al. |
| 5,335,013 | A | 8/1994 | Faber |
| 5,374,954 | A | 12/1994 | Mowry |
| 5,406,326 | A | 4/1995 | Mowry |
| 5,453,840 | A | 9/1995 | Parker et al. |
| 5,457,491 | A | 10/1995 | Mowry |
| 5,461,596 | A | 10/1995 | Barrett |
| 5,471,572 | A | 11/1995 | Buchner et al. |
| 5,475,425 | A | 12/1995 | Przyborski et al. |
| 5,526,446 | A | 6/1996 | Adelson et al. |
| 5,550,815 | A | 8/1996 | Cloonan et al. |
| 5,629,769 | A | 5/1997 | Cookingham et al. |
| 5,641,596 | A | 6/1997 | Gray et al. |
| 5,659,382 | A | 8/1997 | Rybczynski |
| 5,687,011 | A | 11/1997 | Mowry |
| 5,706,361 | A | 1/1998 | Kent et al. |
| 5,709,972 | A | 1/1998 | Cookingham et al. |
| 5,715,008 | A | 2/1998 | Sekiguchi et al. |
| 5,742,892 | A | 4/1998 | Chaddha |
| 5,751,398 | A | 5/1998 | Beard |
| 5,767,860 | A | 6/1998 | Zimmer et al. |
| 5,805,782 | A | 9/1998 | Foran |
| 5,817,447 | A | 10/1998 | Yip |
| 5,831,673 | A | 11/1998 | Przyborski et al. |
| 5,845,017 | A | 12/1998 | Keyes |
| 5,917,609 | A | 6/1999 | Breeuwer et al. |
| 6,067,125 | A | 5/2000 | May |
| 6,134,200 | A | 10/2000 | Timmermans |
| 6,216,838 | B1 | 4/2001 | Bacher |
| 6,219,838 | B1 | 4/2001 | Cherichetti et al. |
| 6,233,647 | B1 | 5/2001 | Bentz et al. |
| 6,269,180 | B1 | 7/2001 | Sevigny |
| 6,285,711 | B1 | 9/2001 | Ratakonda et al. |
| 6,327,304 | B1 | 12/2001 | Miller et al. |
| 6,327,391 | B1 | 12/2001 | Ohnishi et al. |
| 6,370,192 | B1 | 4/2002 | Pearlstein et al. |
| 6,373,992 | B1 | 4/2002 | Nagao |
| 6,441,918 | B1 | 8/2002 | Hori |
| 6,459,699 | B1 | 10/2002 | Kimura et al. |
| 6,496,221 | B1 | 12/2002 | Wolf et al. |
| 6,559,849 | B1 | 5/2003 | Anderson et al. |
| 6,587,509 | B1 | 7/2003 | Suzuki et al. |
| 6,650,327 | B1 | 11/2003 | Airey et al. |
| 6,665,369 | B2 | 12/2003 | Ukita |
| 6,667,815 | B1 | 12/2003 | Nagao |
| 6,724,942 | B1 | 4/2004 | Arai |
| 6,728,317 | B1 | 4/2004 | Demos |
| 6,744,928 | B1 | 6/2004 | Juri et al. |
| 6,839,152 | B2 | 1/2005 | Fan et al. |
| 6,868,190 | B1 | 3/2005 | Morton |
| 6,963,668 | B2 | 11/2005 | Engeldrum et al. |
| 6,990,251 | B2 | 1/2006 | Edgar |
| 6,990,252 | B2 | 1/2006 | Shekter |
| 6,995,793 | B1 | 2/2006 | Albadawi et al. |
| 7,065,255 | B2 | 6/2006 | Chen et al. |
| 7,092,016 | B2 | 8/2006 | Morton et al. |
| 7,106,907 | B2 | 9/2006 | Lin et al. |
| 7,245,783 | B2 | 7/2007 | Fielding |
| 7,286,565 | B1 | 10/2007 | Carr |
| 7,362,911 | B1 | 4/2008 | Frank |
| 7,596,239 | B2 | 9/2009 | Winger et al. |
| 7,630,005 | B2 | 12/2009 | Takei |
| 7,653,132 | B2 | 1/2010 | Dang |
| 7,664,337 | B2 | 2/2010 | Balram et al. |
| 7,738,722 | B2 | 6/2010 | Gomila et al. |
| 7,742,655 | B2 | 6/2010 | Gomila et al. |
| 7,856,055 | B2 | 12/2010 | Zhou et al. |
| 7,958,532 | B2 | 6/2011 | Paul et al. |
| 2001/0056568 | A1 | 12/2001 | Hirotsu et al. |
| 2002/0003903 | A1 | 1/2002 | Engeldrum et al. |
| 2002/0016103 | A1 | 2/2002 | Behnke |
| 2002/0034337 | A1 | 3/2002 | Shekter |
| 2002/0133764 | A1 | 9/2002 | Wang |
| 2002/0154140 | A1 | 10/2002 | Tazaki |
| 2002/0163657 | A1 | 11/2002 | Bogdanowicz |
| 2002/0171649 | A1 | 11/2002 | Fogg |
| 2003/0011615 | A1 | 1/2003 | Tidwell |
| 2003/0031128 | A1 | 2/2003 | Kim et al. |
| 2003/0043922 | A1 | 3/2003 | Kalker |
| 2003/0063778 | A1 | 4/2003 | Rowe et al. |
| 2003/0068097 | A1 | 4/2003 | Wilson et al. |
| 2003/0086623 | A1 | 5/2003 | Berkner et al. |
| 2003/0101453 | A1 | 5/2003 | Matsuyama |
| 2003/0206231 | A1 | 11/2003 | Chen et al. |
| 2003/0206662 | A1 | 11/2003 | Avinash |
| 2003/0218610 | A1 | 11/2003 | Mech et al. |
| 2004/0013308 | A1 | 1/2004 | Jeon et al. |
| 2004/0073926 | A1 | 4/2004 | Nakamura et al. |
| 2004/0101059 | A1 | 5/2004 | Joch et al. |
| 2006/0082649 | A1 | 4/2006 | Gomila et al. |
| 2006/0083316 | A1 | 4/2006 | Cooper et al. |
| 2006/0083426 | A1 | 4/2006 | Cooper et al. |
| 2006/0083429 | A1 | 4/2006 | Joly |
| 2006/0104366 | A1 | 5/2006 | Huang et al. |
| 2006/0182183 | A1 | 8/2006 | Winger |
| 2006/0183275 | A1 | 8/2006 | Schoner |
| 2006/0256853 | A1 | 11/2006 | Schlockermann et al. |
| 2006/0291557 | A1 | 12/2006 | Tourapis |
| 2007/0002947 | A1 | 1/2007 | Lu et al. |
| 2007/0030996 | A1 | 2/2007 | Winger et al. |
| 2007/0036452 | A1 | 2/2007 | Llach et al. |
| 2007/0047658 | A1 | 3/2007 | Tourapis et al. |
| 2007/0058866 | A1 | 3/2007 | Boyce et al. |
| 2007/0058878 | A1* | 3/2007 | Gomila et al. ............... 382/254 |
| 2007/0070241 | A1* | 3/2007 | Boyce et al. ................. 348/441 |
| 2007/0104380 | A1 | 5/2007 | Gomila et al. |
| 2007/0117291 | A1 | 5/2007 | Cooper et al. |
| 2007/0297515 | A1* | 12/2007 | Gomila et al. ........... 375/240.18 |
| 2008/0252781 | A1 | 10/2008 | DeWaele et al. |

FOREIGN PATENT DOCUMENTS

| | | |
|---|---|---|
| EP | 0622000 | 10/1992 |
| EP | 0575006 | 12/1993 |
| EP | 0622000 | 3/2000 |
| EP | 1175091 | 1/2002 |
| EP | 1215624 | 6/2002 |
| EP | 1511320 | 3/2005 |
| GB | 2312124 | 10/1997 |
| JP | 1156069 | 6/1989 |
| JP | 3187661 | 8/1991 |
| JP | 4097681 | 3/1992 |
| JP | 5252459 | 9/1993 |
| JP | 8079765 | 3/1996 |
| JP | 9062718 | 3/1997 |
| JP | 9139940 | 5/1997 |
| JP | 9247681 | 9/1997 |
| JP | 10509297 | 9/1998 |
| JP | 11 250246 | 9/1999 |
| JP | 200041242 | 8/2000 |
| JP | 2001/357090 | 12/2001 |

(56) References Cited

FOREIGN PATENT DOCUMENTS

| | | |
|---|---|---|
| JP | 2001357090 | 12/2001 |
| JP | 2001357095 | 12/2001 |
| JP | 2002057719 | 2/2002 |
| JP | 2002374541 | 12/2002 |
| JP | 2003/024326 | 1/2003 |
| JP | 200324326 | 1/2003 |
| JP | 2003163853 | 6/2003 |
| JP | 2003179923 | 6/2003 |
| JP | 2004120057 | 4/2004 |
| JP | 2004135169 | 4/2004 |
| JP | 2005080301 | 3/2005 |
| JP | 2007507172 | 3/2007 |
| JP | 2007521573 | 8/2007 |
| JP | 2007529945 | 10/2007 |
| RU | 2073913 | 9/1991 |
| RU | 2088962 | 8/1997 |
| RU | 2139637 | 10/1999 |
| RU | 2139637 | 1/2001 |
| WO | WO9314591 | 7/1993 |
| WO | WO 94/04960 | 3/1994 |
| WO | WO9520292 | 7/1995 |
| WO | WO9710676 | 3/1997 |
| WO | WO9722204 | 6/1997 |
| WO | WO9841026 | 9/1998 |
| WO | WO0018109 | 3/2000 |
| WO | WO0146992 | 6/2001 |
| WO | WO0174064 | 10/2001 |
| WO | WO0177871 | 10/2001 |
| WO | WO0233958 | 4/2002 |
| WO | WO0251160 | 6/2002 |
| WO | WO 03/005731 | 1/2003 |
| WO | WO2004077348 | 9/2004 |
| WO | WO2004/095829 | 11/2004 |
| WO | WO2004095829 | 11/2004 |
| WO | WO2004104931 | 12/2004 |
| WO | WO2005027045 | 3/2005 |
| WO | W02005032143 | 4/2005 |
| WO | WO2005032143 | 4/2005 |
| WO | WO2005039188 | 4/2005 |
| WO | WO2006022705 | 3/2006 |
| WO | WO2006057703 | 6/2006 |

OTHER PUBLICATIONS

Auto FX Software: Dreamsuite Series Two, Film Grain, http://web.archive.org/web/20040805085520/www.autofx.com/dreamsuite2/effect_pages/filmgrain.html, Aug. 5, 2004.*

"SEI message for film grain encoding: syntax and results", Christina Gomila, Sep. 2-5, 2003.

Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
Al-Shaykh et al, "Lossy Compression of Images Corrupted by Film Grain Noise," School of Electrical and Computer Engineering, 1996 IEEE.
Al-Shaykh et al. "Restoration of Lossy Compressed Noisy Images," IEEE Transactions on Image Processing, vol. 8, No. 10, Oct. 1999.
Al-Shaykh, "Lossy Compression of Noisy Images," IEEE Transactions on Image Processing, vol. 7, No. 12, Dec. 1998.
Brightwell et al., "Automated Correction of Film Unsteadiness, Dirt and Grain," International Broadcasting Convention, Sep. 16-20, 1994, Conference Publication No. 397, IEE, 1994.
Campisi et al, "Signal-Dependent Film Grain Noise Generation Using Homomorphic Adaptive Filtering," IEE Proceedings, Image Signal Process, vol. 147, No. 3, Jun. 2000.
Chao et al, "Constant Quality Rate Control for Streaming MPEG-4 Fgs. Video," Integrated Media Systems Center and Department of Electrical Engineering, University of Southern California, 2000 IEEE.
Chavel et al., "Film Grain Noise in Partially Coherent Imaging," Optical Engineering, vol. 19, No. 3, May-Jun. 1980.
Fischer et al, "Image Sharpening Using Permutation Weighted Medians," Department of Electrical Engineering, University of Delaware, fischer@ee.udel.edu, paredesj@ee.udel.edu, arce@ee.udel.edu.
Gomila, "SEI Message for Film Grain Encoding," XP-002308742, Joint Video Team (JVT) of ISO/IEC MPEG & ITU-T VCEG, Document: JVT-H022, 8th Meeting, May 23-27, 2003, Geneva, CH.
Illingworth et al, "Vision, Image and Signal Processing," The Institution of Electrical Engineers, IEE Proceedings, Jun. 2000, vol. 147, No. 3.
McLean et al, "Telecine Noise Reduction," XP-002285972, 2001 The Institute of Electrical Engineers.
Oktem et al, "Transform Domain Algorithm for Reducing Effect of Film-Grain Noise in Image Compression," Electronics Letters, Oct. 14, 1999, vol. 35, No. 21.
Peng et al, "Adaptive Frequency Weighting for Fine-Granularity-Scalability," Visual Communications and Image Processing 2002, Proceedings of SPIE, vol. 4671, 2002 SPIE 0277-786X/02.
Prades-Nebot et al, "Rate Control for Fully Fine-Grained Scalable Video Coders," Visual Communications and Image Processing 2002, Proceedings of SPIE, vol. 4671 (2002), SPIE 0277-786X/02.
Schaar et al, "Fine-Granularity-Scalability for Wireless Video and Scalable Storage," Visual Communications and Image Processing 2002, Proceedings of SPIE, vol. 4671 (2002) SPIE 0277-786X/02.
Shahnaz et al, "Image Compression in Signal-Dependent Noise," Applied Optics, vol. 38, No. 26, Sep. 10, 1999.
Yan et al, "Efficient Video Coding with Hybrid Spatial and Fine-Grain SNR Scalabilities," Department of Electronic Engineering, Beijing Institute of Technology, China.
Yan et al, "Film Grain Noise Removal and Generation for Color Images," Department Electrical and Computer Engineers, University of Toronto, dimitris@comm.toronto.edu.
Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.
Yoshida, "Go with the Grain, Film R&D Chief Urges, for Art's Sake," EE Times, Feb. 7, 2005.
Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.
International Search Report Dated Feb. 22, 2006.
Office Action for U.S. Appl. No. 10/552,179 mailed Sep. 1, 2010.
Office Action from U.S. Appl. No. 10/556,833 mailed May 10, 2010.
Final Office Action from U.S. Appl. No. 10/556,833 mailed Oct. 20, 2010.
Office Action ADV ACT from U.S. Appl. No. 10/556,833 mailed Jan. 7, 2011.
Office Action from U.S. Appl. No. 10/556,833 mailed Feb. 15, 2011.
Office Action from U.S. Appl. No. 10/556,833 mailed May 10, 2011.
Office Action from U.S. Appl. No. 10/556,833 mailed Sep. 30, 2011.
Final Office Action from U.S. Appl. No. 10/571,148 mailed May 12, 2010.
Office Action from U.S. Appl. No. 10/571,148 mailed Sep. 10, 2010.
Office Action ADV ACTION from U.S. Appl. No. 10/572,820 mailed Mar. 19, 2010.
Office Action from U.S. Appl. No. 10/572,820 mailed May 11, 2010.
Final Office Action from U.S. Appl. No. 10/572,820 mailed Sep. 30, 2010.
Office Action ADV ACTION from U.S. Appl. No. 10/575,676 mailed Jun. 7, 2010.

(56) References Cited

OTHER PUBLICATIONS

Office Action from U.S. Appl. No. 10/575,676 mailed Jul. 19, 2011.
Finala Office Action from U.S. Appl. No. 10/575,676 mailed Oct. 26, 2011.
Office Action from U.S. Appl. No. 10/581,151 mailed Jan. 20, 2010.
Office Action from U.S. Appl. No. 11/246,474 mailed Sep. 1, 2010.
Office Action from U.S. Appl. No. 11/246,848 mailed Jul. 6, 2010.
Final Office Action from U.S. Appl. No. 11/246,848 mailed Oct. 13, 2010.
Office Action from U.S. Appl. No. 11/268,070 mailed Jul. 21, 2010.
Final Office Action from U.S. Appl. No. 11/268,070 mailed Nov. 12, 2010.
Office Action ADV ACTION from U.S. Appl. No. 11/268,070 mailed Jan. 11, 2011.
Office Action from U.S. Appl. No. 11/268,070 mailed Jun. 22, 2011.
Office Action from U.S. Appl. No. 11/273,067 mailed Aug. 4, 2010.
Office Action from U.S. Appl. No. 11/667,581 mailed Jun. 8, 2011.
Final Office Action from U.S. Appl. No. 11/667,581 mailed Oct. 14, 2011.
Office Action from U.S. Appl. No. 11/667,816 mailed Sep. 15, 2011.
Final Office Action from U.S. Appl. No. 11/667,816 mailed Dec. 5, 2011.
Office Action from U.S. Appl. No. 11/667,846 mailed Oct. 4, 2011.
Office Action from U.S. Appl. No. 11/284,378 mailed Dec. 22, 2010.
Final Office Action from U.S. Appl. No. 11/285,540 mailed Nov. 23, 2010.
Office Action from U.S. Appl. No. 11/285,540 mailed Mar. 30, 2011.
Office Action from U.S. Appl. No. 12/589,217 mailed Jul. 13, 2010.
Final Office Action from U.S. Appl. No. 12/589,217 mailed Oct. 28, 2010.
Office Action ADV ACTION from U.S. Appl. No. 12/589,217 mailed Dec. 2, 2010.
Byun et al: Power Efficient MPEG-4 Decoder Featuring Low-Complexity Error Resilience, ASIC, 2002 Proceedings IEEE Asia Pacific Conference Aug. 6-8, 2002 Piscataway, NJ USA IEEE.
Conklin et al: "Dithering 5-Tap Filter for Inloop Deblocking," JVT of ISO/IEC MPEG & ITU-T VCEG, 3rd Meeting, Fairfax, VA May 6-10, 2002, pp. 1016.
Gomila et al: "Film Grain Modeling vs. Encoding", JVT of ISO/IEC MPEG & ITU-T VCEG 11th Meeting, Munich, DE, Mar. 15-19, 2004.
Naderi et al: "Estimation of Images Degraded by Film Grain Noise", Applied Optics, vol. 17, Issue 8, pp. 1223-1237, Jan. 1, 1978.
Pirsch et al: "VLSI Architures for Video Compression—A Survey", Proceedings of IEEE, New York, USA, vol. 83, No. 2, Feb. 1, 1995, pp. 220-246.
Puri et al: "Video Coding Using the H.264/MPEG-4 AVC Compression Standard", Signal Processing Image Communication, Elsevier Science Publishers, Amsterdam, NL, vol. 19, No. 9. Oct. 1, 2004, pp. 7993-7894.
Takashi et al: "a 60-Mw MPEG-4 Video Codec Using Clustered Voltage Scaling w/Variable Supply Voltage Scheme", IEEE Journal of Solid State Circuits, Piscataway, NJ, Nov. 1998,v.33 #11.
Naderi et al., "Estimation of Images Degraded by Film-Grain Noise", 1978 Optical Society of America, 1978, pp. 1228-1237.
Byun et al., "Power Efficient MPEG-4 Decoder Architecture Featuring Low-Complexity Error Resilience", 2000 IEEE.
Pirsch et al., "VLSI Architectures for Video Compression—A Survey", Proceedings of the IEEE, vol. 83, No. 2, Feb. 1995.
Conklin et al., "Dithering 5-Tap Filter for Inloop Deblocking", JVT of ISO/IEC PEG & ITU-T VCEG, Document: JVT-C056, 3rd eeting: Fairfax, VA, May 6-10, 2002.
Bjontegaard_"Addition_of_comfort_noise_as_post_processing": ITU Telecommunications Standarization Sector, Sunriver, Oregon, Sep. 8, 1997. pp. 102.
Lerner_"Fixed_vs._floating_point: A_surprisingly_hard_choice". eetimes, Feb. 6, 2007. pp. 1-4.
McMahon_EtAl_"High_Quality_SD_and_HD_AVC_Test_Results". Joint Video Team (JVT of ISO/IEC MPEG & ITU-T VCEG) Geneva, Switzerland. Oct. 9, 2002.
Schlockerman_EtAl: "Film Grain_coding_in_H.264/AVC"; JVT (JVT of ISO/IEC MPEG & ITU-T VCEG); 9th Meeting, San Diego, California Sep. 2, 2003.
Wiegand_EtAl_"Overview_of_the_H.264/AVC_Video_Coding_Standard" IEEE Transactions on Circuits and Systems for Video Technology, vol. 13, No. 7. Jul. 2003.
Sullivan_EtAl_"The H.264/AVC advanced_video_coding_standard:_Overview_and_Introduction_to_the_Fidelity_Range_Extensions". Proceedings of SPIE 5558 App of Digital Image Processing XXVII, Nov. 2, 2004.
Schlockerman_EtAl: "Film_Grain_coding_in_H.264/AVC"; JVT (JVT on of ISO/IEC MPEG & ITU-T VCEG); 9th Meeting, San Diego, California Sep. 2, 2003.
Sullivan_EtAl_"The_H.264/AVC_advanced_video_coding_standard:_Overview_and_Introduction_to_the_Fidelity_Range_Extensions". Proceedings of SPIE 5558 App of Digital Image Processing XXVII, Nov. 2, 2004.

\* cited by examiner

FIG. 1
FGM Processing Chain

BIT-ACCURATE FILM GRAIN SIMULATION METHOD BASED ON PRE-COMPUTED TRANSFORMED COEFFICIENTS

CROSS-REFERENCE TO RELATED APPLICATIONS

This application claims the benefit, under 35 U.S.C. §365 of International Application PCT/US2005/038802 filed Oct. 26, 2005 which was published in accordance with PCT Article 21(2) on May 26, 2006 in English and which claims the benefit of U.S. provisional patent application No.'s 60/628,837 filed Nov. 17, 2004.

TECHNICAL FIELD

This invention relates to a technique for simulating film grain in an image.

BACKGROUND OF THE INVENTION

Motion picture films comprise silver-halide crystals dispersed in an emulsion, coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in sizes and shapes. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high-speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T Rec. H.264 ISO/IEC 14496-10 compression techniques usually either result in an unacceptably low degree of compression or complete loss of the grain texture.

Thus, there exists a need for a technique simulating film grain, especially a technique that affords relatively low complexity.

BRIEF SUMMARY OF THE INVENTION

Briefly, in accordance with the present principles, there is provided a method for simulating a film grain pattern. The method begins by obtaining a set of bit-accurate transformed coefficients. The set of bit-accurate transformed coefficients then undergoes filtering. Thereafter, the filtered set of bit-accurate transformed coefficients undergoes a bit-accurate inverse transform to yield a film grain pattern.

DETAILED DESCRIPTION OF THE DRAWINGS

DETAILED DESCRIPTION

Figure 1:
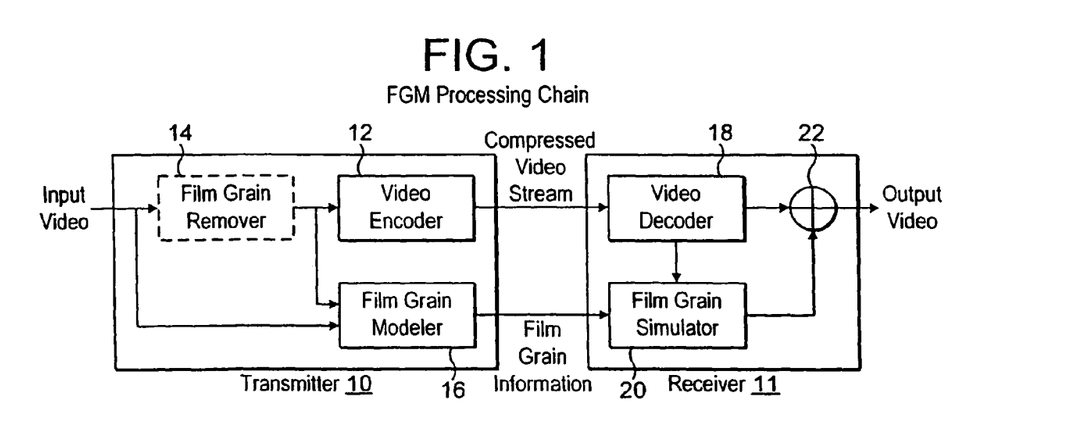
FIG. 1 depicts a block schematic diagram of the combination of a transmitter and receiver in a film grain processing chain useful for practicing the technique of the present principles.

To understand the technique of the present principles for creating a bit-accurate film grain pattern, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprises part of a head-end array of a cable television system, or other such system that distributes compressed video to one or more downstream receivers 11, only one of which is shown in FIG. 1. The transmitter 10 could also take the form of encoder that presents media like DVDs. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video.

The overall management of film grain requires the transmitter 10 (i.e., the encoder) provide information with respect to the film grain in the incoming video. In other words, the transmitter 10 "models" the film grain. Further the receiver 11 (i.e., decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 12 which encodes the video stream using any of the well known video compression techniques such as the ITU-T Rec. H.264|ISO/IEC 14496-10 video compression standard. Optionally, a film grain remover 14, in the form of a filter or the like depicted in dashed lines in FIG. 1, could exist upstream of the encoder 12 to remove any film grain in the incoming video stream prior to encoding. To the extent that the incoming video contains no film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock originally used to record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present.

The receiver 11 typically includes a video decoder 18 that serves to decode the compressed video stream received from the transmitter 10. The structure of the decoder 18 will depend on the type of compression performed by the encoder 12 within the transmitter 10. Thus, for example, the use within the transmitter 10 of an encoder 12 that employs the ITU-T Rec. H.264|ISO/IEC 14496-10 video compression standard to compress outgoing video will dictate the need for an H.264-compliant decoder 18. Within the receiver 11, a film grain simulator 20 receives the film grain information from the film grain model 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11 along with the decoding of the incoming video stream from the transmitter 10 upstream of the output of the decoded video stream. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264|ISO/IEC 14496-10 video compression standard contains no specifications regarding the film grain simulation process. However, film grain simulation requires information concerning the grain pattern in the incoming video signal, which information typically undergoes transmission in a Supplemental Enhancement Information (SEI) message when using the ITU-T Rec. H.264|ISO/IEC 14496-10 video compression standard as specified by the Amendment 1 (Fidelity Range Extensions) of that compression standard.

In accordance with the present principles, disclosed herein are several implementations of a method for creating a bit-accurate film grain pattern, such as for storage in a database for film grain simulation in HD DVD systems. Such a film grain pattern database enables film grain simulation in accordance with the parameters in a film grain Supplemental Enhancement Information (SEI) message according to the H.264|MPEG-4 AVC standard as discussed above. More specifically, devices and systems that implement the existing or future HD DVD specifications can employ such a film grain pattern database to store samples of different film grain types, each characterized by different frequency model parameters.

As discussed in detail below, the method of the present principles for creating a bit-accurate pattern of film grain makes use of a basic strategy that enables implementation in several different ways within the receiver 11. The basic strategy for creating a bit-accurate film grain pattern begins by establishing a set of integer transformed coefficients, typically, although not necessarily, Discrete Cosine Transformed (DCT) coefficients, typically N×N in size where N is an integer. The term "image" will some times refer to such a set of integer transformed coefficients. The step of establishing a set or image of integer transformed coefficients can occur in several different ways. For example, the establishing step could entail the processor or discrete logic circuitry in the receiver 11 of FIG. 1 accessing a database of integer-transformed coefficients as described hereinafter. Alternatively, the processor or discrete logic circuitry in the receiver 11 could establish a set or image of Gaussian random numbers, by either reading a database of such numbers or generating them directly. Thereafter, an integer DCT would be performed on the Gaussian random number image to yield a set of integer DCT coefficients.

The next step in the basic process of creating a bit-accurate film grain pattern entails frequency filtering the integer-transformed coefficients according to a desired film grain size and shape. For example, the frequency filtering could employ a predefined set of cut frequencies $f_{HL}$, $f_{VL}$, $f_{HH}$, and $f_{VH}$ that represent cut-off frequencies (in two dimensions) of a filter that characterizes the desired film grain pattern. Following the frequency filtering, the integer transformed coefficients undergo an inverse transform to create the bit-accurate film grain pattern for subsequent storage in a database. In some instances, scaling could occur following the inverse transform of the coefficients.

In practice, the film grain pattern creation method of the present principles makes use of integer DCT and inverse DCT operations, thus assuring bit accuracy which proves useful for verification and testing purposes. However, different implementations of the basic strategy as described below do not necessarily afford bit accuracy between each other. Choosing a particular implementation will depend on the desired tradeoff between memory requirements and computational cost.

Figure 2:
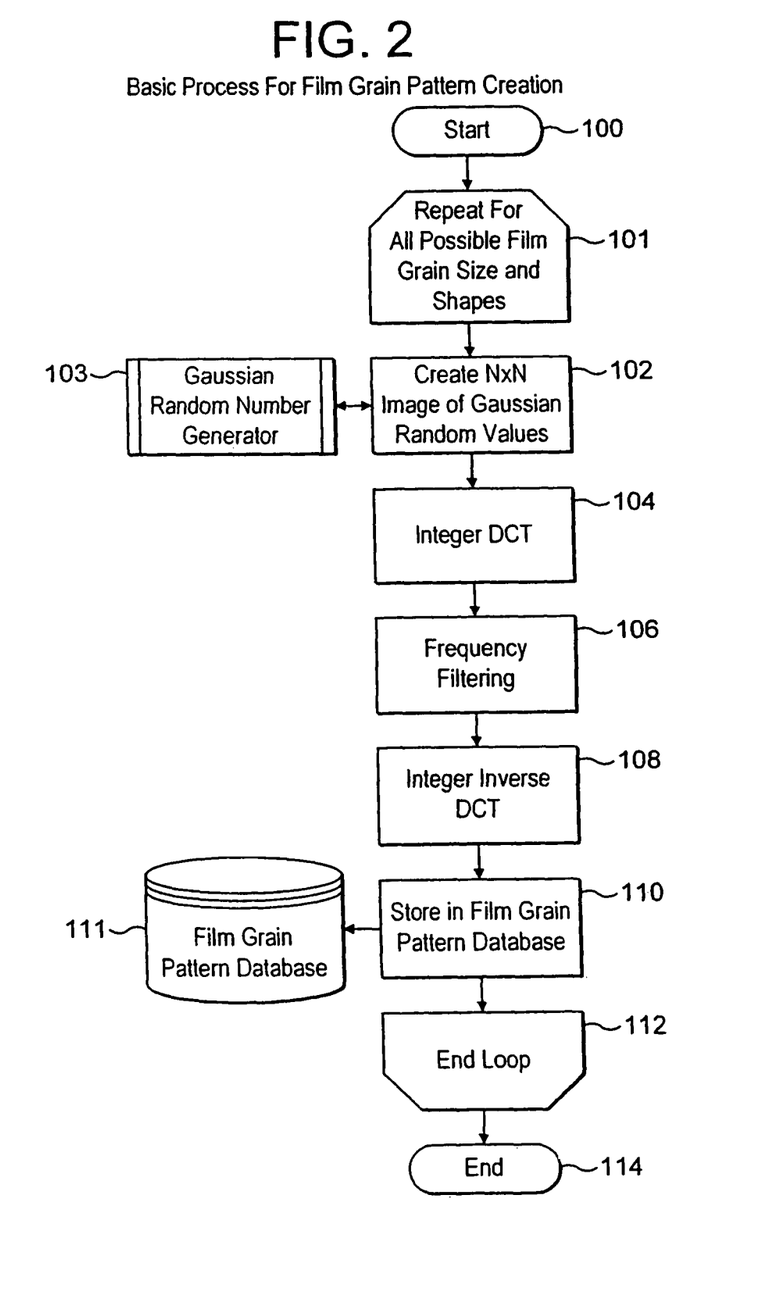
FIG. 2 depicts, in flow chart form, the steps of a method for creating a bit-accurate film grain pattern using a Gaussian random number generator.

FIG. 2 illustrates a first implementation of a method in accordance with the present principles for creating a bit-accurate pattern of film grain. The method of FIG. 2 commences upon execution of the start step 100 during which initialization occurs, although such initialization need not necessarily happen. Next step 101 occurs, initiating entry into a loop that repeats for all possible film grain sizes and shapes. Upon entry into the loop, step 102 occurs to achieve creation of an image of random Gaussian values. In practice, the Gaussian random image has a size of N×N values. In the method of FIG. 2, creation of the image of Gaussian random values occurs by generating such values via a Gaussian random number generator 103.

The image of Gaussian random values created during step 102 then undergoes a bit-accurate transform, typically by way of an integer Discrete Cosine Transform (DCT) operation during step 104, although other bit-accurate transform techniques exist. The integer DCT coefficients established during step 102 then undergo frequency filtering during step 106. Typically, the frequency filter occurs using a predefined set of cut frequencies $f_{HL}$, $f_{VL}$, $f_{HH}$, and $f_{VH}$ that represent cut-off frequencies (in two dimensions) of a filter that characterizes the desired film grain pattern. Next step 108 occurs during which the frequency filtered, transformed coefficients undergo an inverse bit-accurate transformation, typically, although not necessarily, an integer Inverse Discrete Cosine Transformation (IDCT), to yield a bit-accurate film grain pattern. Under some circumstances, scaling of the inversely transformed block of coefficient following step 108 will prove useful to vary the intensity of the bit-accurate film grain pattern.

Following step 108, step 110 occurs and the bit-accurate film grain that results from the integer IDCT transformation (and scaling if performed) undergoes storage in a database 111. Steps 102-110 undergo repeating during execution of the loop initiated during step 101. The loop continues for all possible film grain sizes and shapes, whereupon loop execution ends during step 112, after which the method ends during step 114.

To achieve bit accuracy, the method of FIG. 2 requires a bit-accurate Gaussian random number generator and bit-accurate DCT and Inverse DCT transform operations. Achieving bit accuracy among different implementations of the present method requires the use of a bit-accurate Gaussian random number generator. Which particular Gaussian random number generator is used remains unimportant as long as all implementations use the same generator. As example, one could use the integer approximation of a bit-accurate Gaussian generator described in the publication "Numerical Recipes in C: The Art of Scientific Computing" (ISBN 0-521-41108-5), which is based on the Box-Muller transformation.

In addition to a bit-accurate Gaussian random number generator, a bit-accurate implementation of a Discrete Cosine Transform remains necessary to provide bit accuracy for the whole system. The illustrated embodiments described herein make use of an integer approximation of the DCT. The use of any integer approximation remains possible if the result obtained by the integer transformation lies reasonably close to the result obtained by the floating point DCT. This requirement ensures that the filtering performed in the transformed domain constitutes frequency filtering.

In the illustrated embodiment, an integer version of the DCT occurs by scaling the floating point version of the DCT. The N×N DCT matrix can be computed as:

```
for ( i = 0; i < N; j++)
        for (j = 0; j < N; j++)
{
        if(i == 0)k = sqrt(1/N);
        else    k = sqrt(2/N);
C(i,j) = k * cos( ((2*j+1)*i*PI) / (2*N));
}
``` where C(i,j) represents the coefficient of the transformation matrix at row j and column i. Then, the integer matrix is computed as:

```
for ( i = 0; i < N; j++)
    for (j = 0; j < N; j++)
{
        Cint(i,j) = round( C(i,j) * scaling_factor)
}
``` where round(x) returns the nearest integer approximation of x, and the scaling_factor is a positive integer value. The value of the scaling factor determines the quality of the integer approximation of the DCT (the larger the scaling factor, the better the approximation) as well as the number of bits required to compute the transform (the smaller the scaling factor, the lesser bits are required).

Once the integer approximation of the DCT has been defined, the DCT transform is computed as follows:

$$B=((Cint^T*b*Cint)+2^{scaling\_factor})>>2*scaling\_factor$$

where $Cint^T$ denotes the transposed version of the transformation matrix. Analogously, the inverse transform is computed as follows:

$$b=((Cint*B*CintT)+2^{scaling\_factor})>>2*scaling\_factor$$

In a particular embodiment where an 8×8 DCT is used, the integer approximation would be:

$$Cint_8^T = \begin{pmatrix} 6 & 6 & 6 & 6 & 6 & 6 & 6 & 6 \\ 8 & 7 & 4 & 2 & -2 & -4 & -7 & -8 \\ 7 & 3 & -3 & -7 & -7 & -3 & 3 & 7 \\ 7 & -2 & -8 & -4 & 4 & 8 & 2 & -7 \\ 6 & -6 & -6 & 6 & 6 & -6 & -6 & 6 \\ 4 & -8 & 2 & 7 & -7 & -2 & 8 & -4 \\ 3 & -7 & 7 & -3 & -3 & 7 & -7 & 3 \\ 2 & -4 & 7 & -8 & 8 & -7 & 4 & -2 \end{pmatrix}$$

with scale factor equal to 16.

Figure 3:
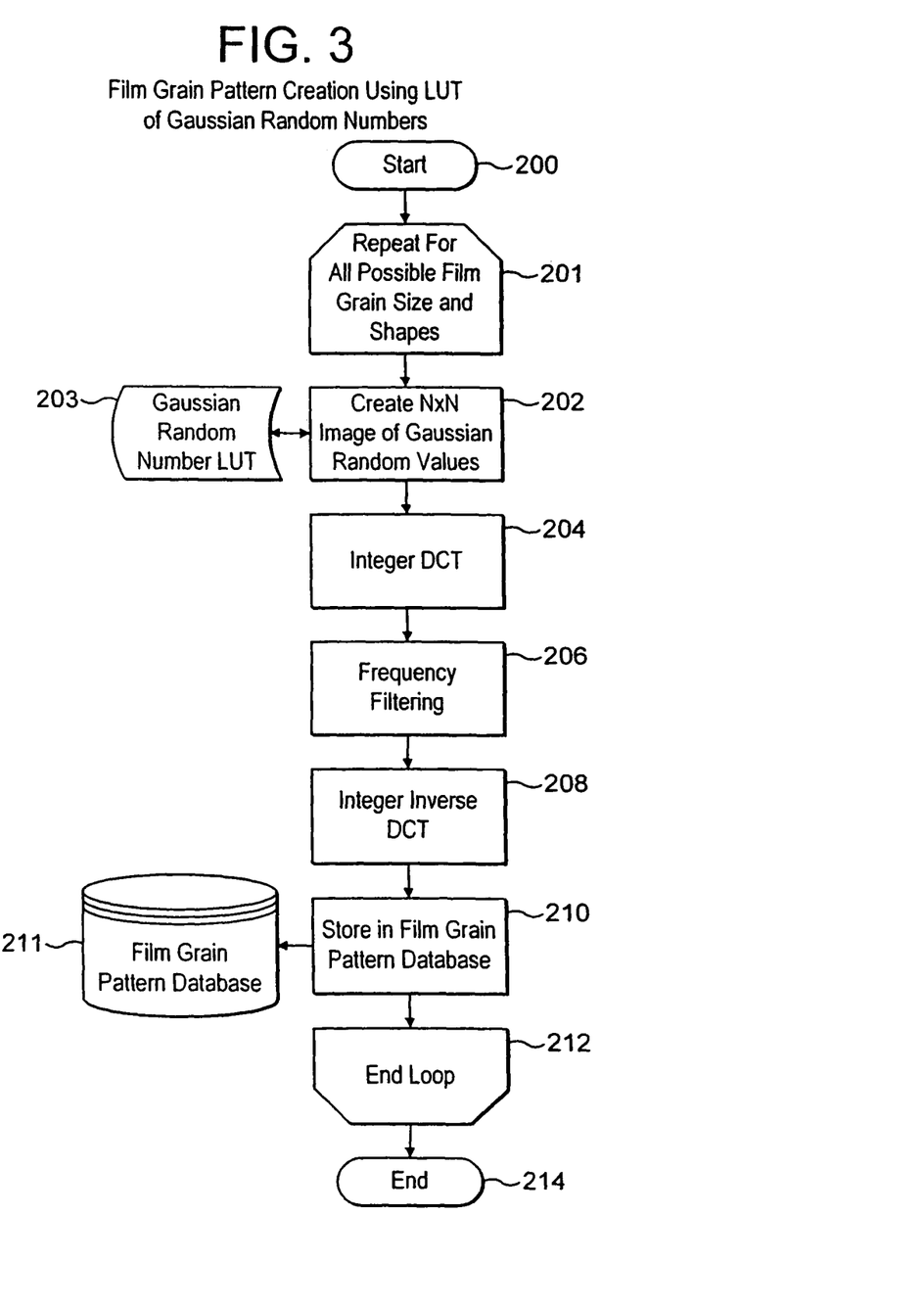
FIG. 3 depicts, in flow chart form, the steps of a method for creating a bit-accurate film grain pattern using a Gaussian random number look up table.

FIG. 3 illustrates a second implementation of a method in accordance with the present principles for creating a bit-accurate pattern of film grain. The method of FIG. 3 commences upon execution of the start step 200 during which initialization occurs, although such initialization need not necessarily happen. Next step 201 occurs, initiating entry into a loop that repeats for all possible film grain sizes and shapes. Upon entry into the loop, step 202 executes to create a set or image of random Gaussian values. In practice, the Gaussian random image has a size of N×N values. Creation of the image of Gaussian random values occurs during execution of the method of FIG. 3 by reading a set of Gaussian random values from a Gaussian random number look-up table (LUT) 203.

The image of Gaussian random values obtained during step 202 then undergoes a bit-accurate transform, typically by way of an integer Discrete Cosine Transform (DCT) operation during step 204, although other bit-accurate transform techniques exist. The integer transformed coefficients established during step 202 then undergo frequency filtering during step 206. Typically, the frequency filter occurs using a predefined set of cut frequencies $f_{HL}$, $f_{VL}$, $f_{HH}$, and $f_{VH}$ that represent cut-off frequencies (in two dimensions) of a filter that characterizes the desired film grain pattern. Next step 208 occurs during which the frequency filtered block of transformed coefficients undergoes an inverse bit-accurate transformation, typically, although not necessarily, an integer Inverse Discrete Cosine Transformation (IDCT), to yield a bit-accurate film grain pattern. Under some circumstances, scaling of the frequency filtered, inverse transformed block of coefficients will prove useful.

Thereafter, step 210 occurs and the film grain pattern resulting from the integer inverse transformation (and scaling if performed) undergoes storage in a database 211. The steps 202-210 within the loop initiated during step 201 undergo repeating for all possible film grain sizes and shapes, whereupon loop execution ends during step 212, after which the method ends during step 214. In this way, the database 211 stores a plurality of film grain patters for future use in simulating film grain in a video signal.

As compared to the method of FIG. 2, the film grain simulation method of FIG. 3 obviates the use of a Gaussian random number generator. Instead, the method of FIG. 3 makes use of the look-up table 203 that contains pre-computed Gaussian random values. The approach simplifies the required hardware needed for implementation.

Figure 4:
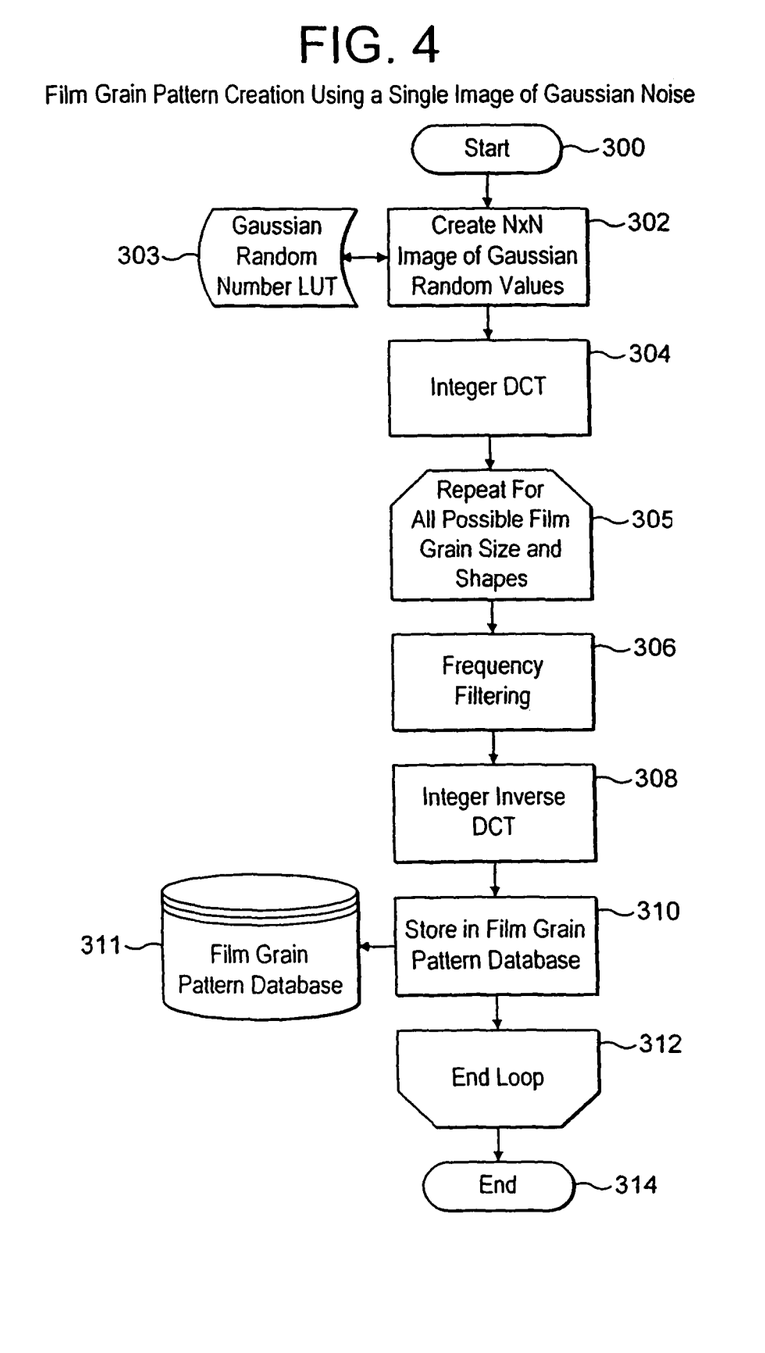
FIG. 4 depicts, in flow chart form, the steps of a method for creating a bit-accurate film grain pattern creation using a single image of Gaussian noise.

FIG. 4 illustrates a third implementation of a method in accordance with the present principles for creating a bit-accurate pattern of film grain. The method of FIG. 4 commences upon execution of the start step 300 during which initialization occurs, although such initialization need not necessarily happen. Next, step 302 occurs to create a set or image of random Gaussian values. In practice, the Gaussian random image has a size of N×N values. Creation of the image of Gaussian random values occurs in the method of FIG. 4, by reading a set of Gaussian random values from a Gaussian random number look up table (LUT) 303. The method used to create the Gaussian random number LUT 303 does not require bit accuracy. As long as all implementations of the film grain pattern database creation use the same LUT, the result assures bit accuracy. However, when using a bit-accurate method to create such a LUT, then LUT generation can occur at the beginning of the film grain pattern database creation process, avoiding the need for permanent storage of the LUT. Given that a single transform (step 304) needs to be computed for the generation of the entire film grain pattern database, the randomness of the film grain patterns stored in the database is reduced when compared to the result obtained with previously illustrated implementations (FIGS. 2 and 4). However, the third implementation illustrated in FIG. 4 also has lower computational needs, which proves useful for hardware and/or real-time implementations. The image of Gaussian random values created during step 302 then undergoes a bit-accurate transform, typically by way of an integer Discrete Cosine Transform (DCT) operation during step 304; although other bit-accurate transform techniques exist. Following step 304, step 305 occurs which initiates entry into a loop that repeats for all possible film grain sizes and shapes. Step 306, the first step within the loop, initiates frequency filtering of the integer DCT coefficients established during step 304. Typically, the frequency filter occurs using a predefined set of cut frequencies $f_{HL}$, $f_{VL}$, $f_{HH}$, and $f_{VH}$ that represent cut-off frequencies (in two dimensions) of a filter that characterizes the desired film grain pattern. Following step 306, the frequency filtered integer DCT coefficients undergoes an inverse bit-accurate transformation, typically, although not necessarily, an integer Inverse Discrete Cosine Transformation (IDCT), during step 308 to yield a bit-accurate film grain pattern. Under some circumstances, scaling of film grain pattern created from the inversely transformed coefficients following step 308 will prove useful. Thereafter, step 310 occurs and the film grain pattern undergoes storage in a database 311.

Steps 306-310 within the loop initiated during step 305 undergo for all possible film grain sizes and shapes, whereupon loop execution ends during step 312, after which the method ends during step 314. In this way, the database 311 stores film grain patterns for all sizes and shapes of film grain.

Figure 5:
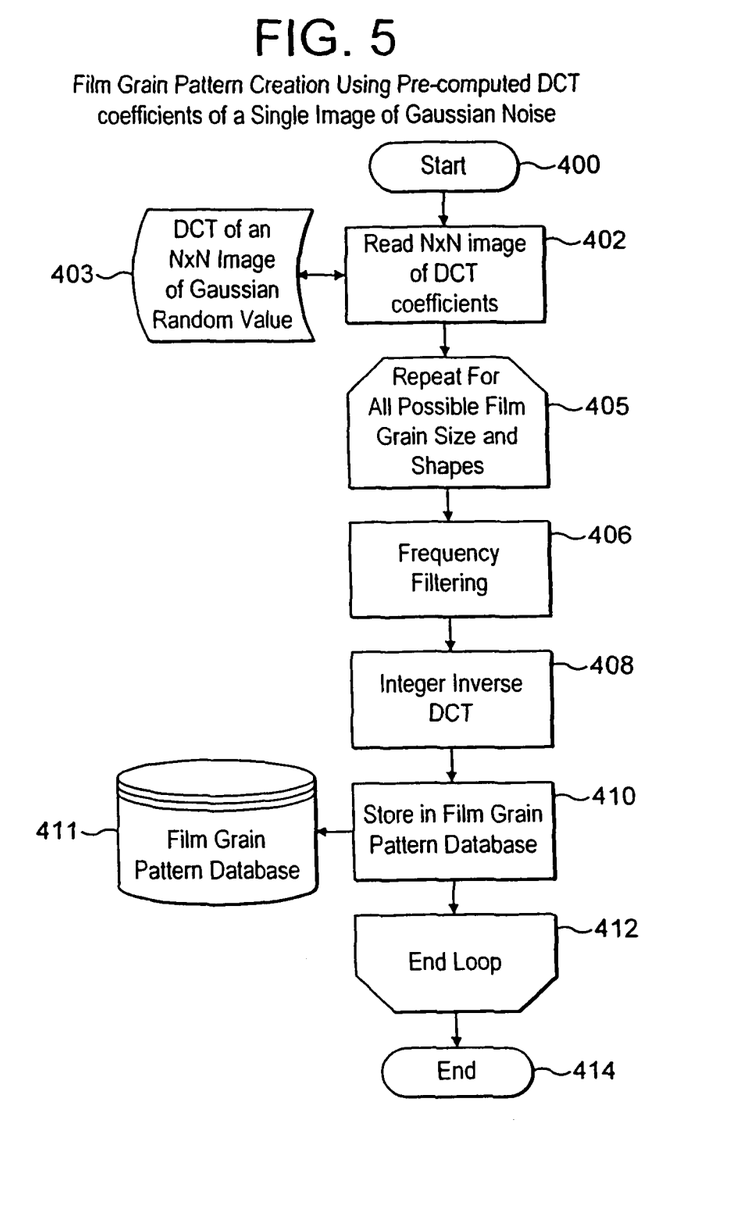
FIG. 5 depicts, in flow chart form, the steps of a method for creating a bit-accurate film grain pattern creation using a set of pre-computed Discrete Cosine Transformed (DCT) coefficients of a single image of Gaussian noise.

FIG. 5 illustrates a fourth implementation of a method in accordance with the present principles for creating a bit-accurate pattern of film grain. The method of FIG. 5 commences upon execution of the start step 400 during which initialization occurs, although such initialization need not necessarily happen. Next, step 402 occurs, during which an image or set of DCT coefficients is read from a look-up table 403 created from an image of Gaussian random values. In practice, the image of DCT coefficients read from the LUT 403 has a size of N×N. Thus, unlike the previously described implementations of FIGS. 2-4, the film grain simulation method of FIG. 5 obviates the need to perform a separate integer DCT operation since the values read from the LUT 403 have already undergone such a transformation prior to loading into the LUT.

Following step 402, step 405 occurs which initiates entry into a loop that repeats for all possible film grain sizes and shapes. Step 406, the first step within the loop, initiates frequency filtering of the integer DCT coefficients obtained during step 402. Typically, the frequency filter occurs using a predefined set of cut frequencies $f_{HL}$, $f_{VL}$, $f_{HH}$, and $f_{VH}$ that represent cut-off frequencies (in two dimensions) of a filter that characterizes the desired film grain pattern. Following step 406, the frequency filtered integer DCT coefficients undergo an inverse bit-accurate transformation, typically, although not necessarily, an integer Inverse Discrete Cosine Transformation (IDCT), during step 408 to yield a pattern of film grain. Under some circumstances, scaling of the inversely transformed block of coefficients following step 408 will prove useful. Thereafter, step 410 occurs and the film grain pattern resulting from the integer IDCT transformation (and scaling if performed) undergoes storage in a database 411.

Steps 406-410 within the loop initiated during step 405 undergo repeating for all possible film grain sizes and shapes, whereupon loop execution ends during step 412, after which the method ends during step 414. In this way, the database 411 stores film grain patterns for all sizes and shapes of film grain.

The method of FIG. 5 makes use of a single pre-computed block of transformed coefficients to generate the film grain patterns that populate the database 411. Compared to the previous implantations described in connection with FIGS. 2-4, implementation of FIG. 5 eliminates the step of performing an integer DCT transform, thus reducing computational cost.

Figure 6:
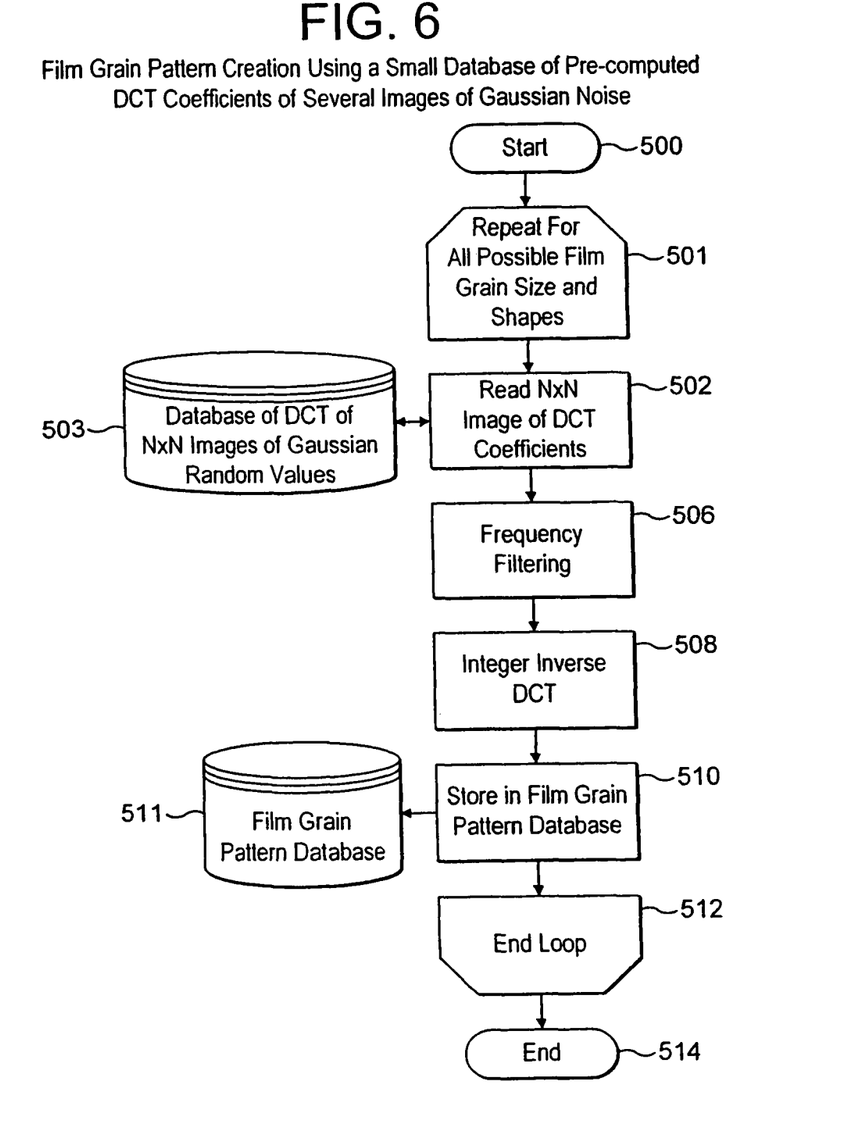
FIG. 6 depicts, in flow chart form, the steps of a method for creating a bit-accurate film grain pattern using pre-computed DCT coefficients of several images of Gaussian noise.

FIG. 6 illustrates a fifth implementation of a method in accordance with the present principles for creating a bit-accurate pattern of film grain. The method of FIG. 6 commences upon execution of the start step 500 during which initialization occurs, although such initialization need not necessarily happen. Next, step 501 occurs, initiating entry into a loop that repeats for all possible film grain sizes and shapes. Step 502, the first step in the loop initiates reading of an image of set of integer DCT coefficients from a look up table (LUT) 503. In practice, the image of DCT coefficients has a size of N×N. Like the implementation of FIG. 5, the implementation of FIG. 6 establishes an image of integer transformed coefficients image by obtaining a set of integer DCT coefficients from the LUT 503. In practice, the values within the LUT 503 originate from an image of Gaussian random values that subsequently undergo an integer DCT. Thus, unlike the previously described implementations of FIGS. 2-4, the implementation of FIG. 6, like that of FIG. 5, obviates the need to perform a separate integer DCT since the values read from the look-up table 503 have already undergone such a transformation prior to loading in the table.

Following step 502, step 506 occurs during which the integer DCT coefficients undergo frequency filtering. Typically, the frequency filter occurs using a predefined set of cut frequencies $f_{HL}$, $f_{VL}$, $f_{HH}$, and $f_{VH}$ that represent cut-off frequencies (in two dimensions) of a filter that characterizes the desired film grain pattern. Following step 506, the frequency filtered integer DCT coefficients undergo an inverse bit-accurate transformation, typically, although not necessarily, an integer Inverse Discrete Cosine Transformation (IDCT), to yield a block of film grain during step 508. Under some circumstances, scaling of the inversely transformed block of coefficient following step 508 will prove useful. Thereafter, step 510 occurs and the block of film grain that results from the integer IDCT transformation (and scaling if performed) undergoes storage in a database 511.

Steps 502-510 within the loop initiated during step 501 undergoes repeating for all possible film grain sizes and shapes, whereupon loop execution ends during step 512, after which the method ends during step 514. In this way, the database 511 stores film grain patterns for all sizes and shapes of film grain.

The implementation of film grain pattern creation described with respect to FIG. 6, like the implementation of FIGS. 2 and 3, makes use of different sets of integer DCT coefficients. Using different sets of integer DCT coefficients allows for creation of a richer database of film blocks patterns as compared to the implementation of FIGS. 1, 4 and 5, which utilizes a single block of integer transformed coefficients. While the implementation described with respect to FIGS. 1, 4 and 5 affords reduced storage and computational requirements, such implementations lower afford performance because the same noise pattern serves as the basis for generating all film grain patterns.

The foregoing describes several different implementations of a technique for creating at least one, and preferably a plurality of film grain patterns for simulating film grain in a video signal.

The invention claimed is:

1. A method of creating a pattern of bit-accurate film grain, comprising the steps of:
    (a) establishing a set of bit-accurate transformed coefficients by scaling a floating point version of a Discrete Cosine Transformed (DCT) matrix of coefficients;
    (b) frequency filtering the matrix of bit-accurate transformed coefficients; and
    (c) performing a bit-accurate inverse transformation on the frequency filtered transformed coefficients to yield a bit-accurate film grain pattern for blending in an image; and
    (d) automatically repeating steps (a) - (c) for different sizes and shapes of film grain.

2. The method according to claim 1 further comprising step of (e) storing the film grain pattern in a database.

3. The method according to claim 1 wherein the matrix of DCT coefficients is obtained from a database of stored values.

4. The method according to claim 1 wherein the matrix of DCT coefficients is obtained by performing an integer Discrete Cosine Transformation on an image of Gaussian random numbers.

5. The method according to claim 1 wherein the frequency filtering step makes use of a predefined set of cut frequencies $f_{HL}$, $f_{VL}$, and $f_{HH}$, and $f_{VH}$ that represent cut-off frequencies, in two dimensions of a filter that characterizes the desired film grain pattern.

6. The method according to claim 1 wherein the step of performing a bit-accurate inverse transformation on the frequency filtered transformed coefficients comprises the step of performing an integer inverse Discrete Cosine Transform.

7. Apparatus comprising one of a processor and dedicated logic circuit for creating a pattern of bit-accurate film grain by (a) establishing a set of bit-accurate transformed coefficients by scaling a floating point version of a Discrete Cosine Transformed (DCT) matrix of coefficients; (b) frequency filtering the matrix of bit-accurate transformed coefficients; (c) performing a bit-accurate transformation on the frequency filtered transformed coefficients to yield a bit-accurate film grain pattern for blending in an image, and (d) automatically and repeating steps (a)-(c) for different possible sizes and shapes of film grain.

8. The apparatus according to claim 7 further comprising a first memory for storing the film grain pattern.

9. The apparatus according to claim 8 further comprising a second memory for storing at least one set of the integer Discrete Cosine Transformed coefficients.

10. The apparatus according to claim 7 further comprising a second memory for storing a plurality of sets of the integer Discrete Cosine Transformed coefficients.

11. The apparatus according to claim 7 further comprising:
    a Gaussian random generator for generating a Gaussian random number image;
    means for performing an integer Discrete Cosine transformation on the Gaussian random number image to yield the set of set of Discrete Cosine bit-accurate transformed coefficients.

12. Apparatus for creating a pattern of bit-accurate film grain, comprising:
    means for establishing a set of bit-accurate transformed coefficients by scaling a floating point version of a Discrete Cosine Transformed (DCT) matrix of coefficients;
    means for frequency filtering the matrix of bit-accurate transformed coefficients; and
    means for automatically performing a bit-accurate transformation on the frequency filtered transformed coefficients to yield a bit-accurate film grain pattern for blending in an image for different sizes and shapes of film grain.

* * * * *